(12) United States Patent
Picardi et al.

(10) Patent No.: US 10,845,079 B1
(45) Date of Patent: Nov. 24, 2020

(54) HVAC ANALYTICS

(71) Applicant: Alarm.com Incorporated, Tysons, VA (US)

(72) Inventors: Robert Nathan Picardi, Herndon, VA (US); Peter Richard Williams, Falls Church, VA (US); Zachary William Seid, Arlington, VA (US); Kyle Rankin Johnson, Falls Church, VA (US); Daniel Marc Goodman, Needham, MA (US); Craig Carl Heffernan, Oregon City, OR (US); Caspar John Anderegg, Centennial, CO (US); Harrison Wayne Donahue, Attleboro, MA (US); Gustaf Nicolaus Maxwell Lonaeus, Washington, DC (US)

(73) Assignee: Alarm.com Incorporated, Tysons, VA (US)

( * ) Notice: Subject to any disclaimer, the term of this patent is extended or adjusted under 35 U.S.C. 154(b) by 160 days.

(21) Appl. No.: 16/022,381

(22) Filed: Jun. 28, 2018

Related U.S. Application Data

(60) Provisional application No. 62/526,126, filed on Jun. 28, 2017.

(51) Int. Cl.
| | |
|---|---|
| *F24F 11/38* | (2018.01) |
| *F24F 11/49* | (2018.01) |
| *F24F 11/58* | (2018.01) |
| *F24F 11/63* | (2018.01) |
| *G06N 20/00* | (2019.01) |

(52) U.S. Cl.
CPC .............. *F24F 11/38* (2018.01); *F24F 11/49* (2018.01); *F24F 11/58* (2018.01); *F24F 11/63* (2018.01); *G06N 20/00* (2019.01)

(58) Field of Classification Search
CPC .. F24F 11/38; F24F 11/63; F24F 11/49; F24F 11/58; G06N 20/00
See application file for complete search history.

(56) References Cited

U.S. PATENT DOCUMENTS

| | | |
|---|---|---|
| 9,447,983 B2 | 9/2016 | Smith et al. |
| 9,551,504 B2 | 1/2017 | Arensmeier et al. |
| 9,645,017 B2 | 5/2017 | Kramer et al. |

(Continued)

*Primary Examiner* — Thomas C Lee
*Assistant Examiner* — Charles Cai
(74) *Attorney, Agent, or Firm* — Fish & Richardson P.C.

(57) ABSTRACT

Systems and techniques are described for alerting individuals of HVAC system issues in their home. In some implementations, a monitoring system monitors a property that includes sensors located throughout the property and generates sensor data. A monitor control unit receives thermostat data from a thermostat that indicates activity of the HVAC system and temperature history of the property. The monitor control unit applies the thermostat and the sensor data to an HVAC model that is trained using past sensor data, past thermostat data, past errors of the HVAC system. The monitor control unit determines an error of the HVAC system from the HVAC model output. The monitor control unit determines an action for correcting the error of the HVAC system. The monitor control unit provides, for output, data identifying the error of the HVAC system and the action for correcting the error of the HVAC system.

20 Claims, 6 Drawing Sheets

(56) References Cited

U.S. PATENT DOCUMENTS

| | | | |
|---|---|---|---|
| 2011/0118896 A1* | 5/2011 | Holloway | G05B 19/0428 |
| | | | 700/300 |
| 2012/0072029 A1* | 3/2012 | Persaud | G05B 23/0235 |
| | | | 700/276 |
| 2015/0168003 A1* | 6/2015 | Stefanski | F24F 11/70 |
| | | | 165/237 |
| 2016/0146493 A1* | 5/2016 | Ettl | G05B 13/04 |
| | | | 700/29 |
| 2017/0292725 A1* | 10/2017 | Conley | F24F 11/30 |
| 2018/0109906 A1* | 4/2018 | Sentz | F24F 11/30 |
| 2018/0121808 A1* | 5/2018 | Ramakrishna | H04L 51/02 |
| 2019/0213446 A1* | 7/2019 | Tsou | G06K 9/6257 |

\* cited by examiner

200

| Obtain thermostat information from monitored property |
| --- |
| 202 |

| Determing an HVAC system issue based on an analysis of the thermostat information using a trained model |
| --- |
| 204 |

| Sort the HVAC issue into a category that specifies a type of the HVAC system issue |
| --- |
| 206 |

| Alert the customer of the HVAC system issue and take additional action based on the sorted category |
| --- |
| 208 |

| Alert a dealer of the HVAC system issue |
| --- |
| 210 |

| Obtain thermostat information from the monitored property indicating that the HVAC system issue has been fixed |
| --- |
| 212 |

Determine that one or more individuals are not located in a monitored property using one or more sensors in the monitored property
402

Perform one or more thermostat tests to determine whether the HVAC is properly working
404

Obtain thermostat information in response to performing the one or more thermostat tests
406

Analyze the thermostat information to determine whether the HVAC is properly working
408

Provide an indication to the user indicating whether the HVAC is properly working
410

```
┌─────────────────────────────────────────────────────────────────────┐
│ Receive, from a thermostat, thermostat data that indicates activity │
│ of the HVAC system and temperature history of a property            │
│                                                                 502 │
└─────────────────────────────────────────────────────────────────────┘
                                  ↓
┌─────────────────────────────────────────────────────────────────────┐
│ Receive, from the one or more sensors, sensor data                  │
│                                                                 504 │
└─────────────────────────────────────────────────────────────────────┘
                                  ↓
┌─────────────────────────────────────────────────────────────────────┐
│ Apply, to an HVAC model that is trained using past sensor data,     │
│ past thermostat data, past errors of the HVAC system, and past      │
│ actions that corrected the errors of the HVAC system, the           │
│ thermostat data and the sensor data                             506 │
└─────────────────────────────────────────────────────────────────────┘
                                  ↓
┌─────────────────────────────────────────────────────────────────────┐
│ Based on applying the thermostat data and the sensor data to the    │
│ HVAC model, determine an error of the HVAC system                   │
│                                                                 508 │
└─────────────────────────────────────────────────────────────────────┘
                                  ↓
┌─────────────────────────────────────────────────────────────────────┐
│ Based on the error of the HVAC system, determine an action for      │
│ likely correcting the error of the HVAC system                      │
│                                                                 510 │
└─────────────────────────────────────────────────────────────────────┘
                                  ↓
┌─────────────────────────────────────────────────────────────────────┐
│ Provide, for output, data identifying the error of the HVAC system  │
│ and the action for likely correcting the error of the HVAC system   │
│                                                                 512 │
└─────────────────────────────────────────────────────────────────────┘
```

FIG. 5

HVAC ANALYTICS

CROSS-REFERENCE TO RELATED APPLICATION

This application claims the benefit of U.S. Provisional Application No. 62/526,126 filed Jun. 28, 2017, and titled "HVAC Analytics," which is incorporated herein by reference.

TECHNICAL FIELD

This specification relates generally to HVAC analytics technology.

BACKGROUND

Heating, Ventilation, and Air Conditioning (HVAC) systems are used to provide thermal comfort and acceptable indoor air quality to residential or commercial facilities. Typically, HVAC systems exchanges or replaces air in a space to remove unpleasant smells, remove excessive moisture, maintain air circulation, and prevent stagnation of the interior air.

SUMMARY

The subject matter of the present disclosure is related to techniques for alerting customers and their associated dealers of heating, ventilation, and air conditioning (HVAC) system issues in their home. This will allow homeowners to take action on HVAC problems that arise and need immediate attention. Additionally, this will increase homeowner awareness of their HVAC system while maintaining a sound peace of mind. These techniques also allow dealers, such as HVAC technicians, to provide better monitoring of their equipment and enabling them to reach out to their customer base experiencing issues to proactively solve their problems.

The data necessary to determine the HVAC issues is gathered through local reporting of operating state changes, temperature and humidity reports, setpoint changes along with associated timestamps from a thermostat provided in a home to an automation hub or security panel. The outdoor weather data necessary to determine HVAC issues is gathered through a third party web database. In addition, other data may be accumulated from various sensors to determine HVAC issues such as energy meters, remote temperature and humidity sensors, in-duct sensors, oil gauge sensors, and other home devices sensors. Those messages are then batched and delivered to a cloud network via cellular and broadband networks or directly forwarded to the cloud network, and are inserted into the appropriate data tables. Once this data is gathered, tasks can be run that use an issue detecting model, or a series of models, to determine whether or not the data collected by a certain thermostat is indicative of an HVAC issue.

The model or models that will be running to detect these issues and subsequently flag systems may employ machine learning methods. Thus, each model will be trained with a set of labeled data consisting of various types of HVAC issues. Each model will be able to determine patterns that are consistent across the set of problematic data points, and will then be able to detect similar patterns when running on data in the production environment. Once the issue is detected, a trouble condition can be associated with that system, and various actions can be taken on this new status.

An example use case for actions regarding an issue status for a system will be the notifications. These notifications can be sent in various forms to both customers and dealers of issues associated with a particular system. Push notifications, emails, text messages, and panel notifications can be sent to customers prompting them to reach out to their trusted HVAC professional. This will result in a new lead generation source that can be monetized or included in the services we provide to our dealers. Dealers, such as HVAC technicians/professionals, can also receive real time alerts and trouble conditions, allowing them to make outbound sales and service calls as a result. In addition, this can improve their warranty offers by catching issues before they become so severe that a system replacement becomes necessary. In addition, this information can be valuable for HVAC manufacturers to see exactly how their system is being used and what failures are occurring, and at what stage in the system's life-cycle.

In addition to notifications, other actions may be taken following the detection of an issue. System damage prevention techniques such as a temperature setback or mode change could be automated in order to prevent the system from failing further. Systems could potentially be automatically turned on to prevent property damage from extreme temperature. More information could be gathered through automating a standard system test or specifically a temperature delta test by comparing the return and supply air temperatures. Connectivity could be checked to determine the confidence in the data we are receiving. Other event triggered rules, such as a light or water valve control.

At any point, dealers can access the graph showing the historical performance of the system by visualizing all of the data points described above. This can help them determine what type of equipment they may need to bring for a tune up or service call, and can help them with remote troubleshooting if customers call in with complaints or questions. Fixing issues without rolling a truck can save HVAC companies time and money. Customers may also be interested in seeing how their systems have been performing, and a simpler graph and UI can be provided using the same data.

A system, such as a security system, can calculate metrics that can provide useful information about the HVAC system performance whether or not the system is broken. Cycle time, aggregate runtime, average temperatures, and other metrics can be calculated which can inform how a system is performing in different areas.

This entire service will be a differentiator to HVAC contractors, who are currently paying lots of money for leads and marketing expenses to acquire new customers. This will be able to deliver leads from our HVAC dealers existing customer base as well as from security accounts that are not able to service HVAC systems. We will also be able to provide a new level of visibility into HVAC performance through data graphing which can assist the dealer in remote troubleshooting, recommending upsells, and overall comprehension of user behavior. The combination of these features will empower HVAC contractors to better serve their customers and gain more value from every thermostat they install.

In one general aspect, a method is performed by one or more computers of a monitoring system. The method includes: a monitoring system that is configured to monitor a property, the monitoring system including: one or more sensors that are located throughout the property and that are configured to generate sensor data; a thermostat that is configured to control an HVAC system located at the property and that is configured to generate thermostat data; a monitor control unit that is configured to: receive, from the thermostat, thermostat data that indicates activity of the HVAC system and temperature history of the property; receive, from the one or more sensors, sensor data; apply, to an HVAC model that is trained using past sensor data, past thermostat data, past errors of the HVAC system, and past actions that corrected the errors of the HVAC system, the thermostat data and the sensor data; based on applying the thermostat data and the sensor data to the HVAC model, determine an error of the HVAC system; based on the error of the HVAC system, determine an action for likely correcting the error of the HVAC system; and provide, for output, data identifying the error of the HVAC system and the action for likely correcting the error of the HVAC system.

Other embodiments of this and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

Implementations may include one or more of the following features. For example, in some implementations, the monitor control unit is configured to: receive sensor data by receiving, from a motion sensor that monitors motion at the property, motion data; apply, to the HVAC model that is trained using the past sensor data, the past thermostat data, the past errors of the HVAC system, and the past actions that corrected the errors of the HVAC system, the thermostat data and the sensor data by applying, to the HVAC model, the thermostat data and the motion data; and determine the error of the HVAC system by determining the error of the HVAC system based on applying the thermostat data and the motion data to the HVAC model.

In some implementations, the method further includes the monitor control unit is configured to: receive sensor data by receiving, from a door or window sensor that monitors whether a door or a window is open or closed, door or window sensor data; apply, to the HVAC model that is trained using the past sensor data, the past thermostat data, the past errors of the HVAC system, and the past actions that corrected the errors of the HVAC system, the thermostat data and the sensor data by applying, to the HVAC model, the thermostat data and the door or window sensor data; and determine the error of the HVAC system by determining the error of the HVAC system based on applying the thermostat data and the door or window sensor data to the HVAC model.

In some implementations, the method further includes the monitor control unit is configured to: based on determining the error of the HVAC system, determine an HVAC error classification that specifies a type of the error; determine the action for likely correcting the error of the HVAC system by determining determine the action for likely correcting the error of the HVAC system based on the HVAC error classification that specifies the type of the error.

In some implementations, the method further includes the type of the error of the HVAC error classification comprises a heating vs. cooling category indicating an issue with the HVAC system not properly heating or cooling the property; an acute vs. inefficient category indicating an issue with one or more components of the HVAC system not working at a predetermined efficiency; a filter change category indicating an issue with an air quality in the property; and a long cycling category indicating an issue with a run time of the HVAC system.

In some implementations, the method further includes the monitor control unit is configured to: receive timestamp data for the sensor data and the thermostat data; and apply, to the HVAC model that is trained using the past sensor data, the past thermostat data, the past errors of the HVAC system, and the past actions that corrected the errors of the HVAC system, the thermostat data and the sensor data by applying, to the HVAC model that is trained using the past sensor data collected during a time of day corresponding to the timestamp data, the past thermostat data collected during a time of day corresponding to the timestamp data, the past errors of the HVAC system, and the past actions that corrected the errors of the HVAC system, the thermostat data and the sensor data.

In some implementations, the method further includes a monitoring server that is further configured to: receive, from other monitoring systems that are configured to monitor other properties, the past sensor data of each monitoring system, the past thermostat data of each monitoring system, the past errors of each HVAC system of each property, and past actions that corrected the errors of each HVAC system of each property; train, using machine learning, the HVAC model using the past sensor data of each monitoring system, the past thermostat data of each monitoring system, the past errors of each HVAC system of each property, and past actions that corrected the errors of each HVAC system of each property; and provide, for output to the monitor control unit, the HVAC model.

In some implementations, the method further includes the past errors of each HVAC system of each property and the error of the HVAC system are a same error.

In some implementations, the method further includes the HVAC system and the HVAC system of the other properties are a same model type.

In some implementations, the method further includes the HVAC system and the HVAC system of the other properties comprise different model types.

In some implementations, the method further includes the monitor control unit is configured to: provide, for output, data identifying the error of the HVAC system and the action for likely correcting the error of the HVAC system, the error comprising at least one of a broken thermostat, unresponsive burner, unresponsive compressor, lack of refrigerant, broken blower, broken evaporator, or a low battery; and provide, for output, data instructing a user to shut off the HVAC system.

In some implementations, the method further includes the monitor control unit is further configured to: after providing, for output, the data identifying the error of the HVAC system and the action for likely correcting the error of the HVAC system, receive data indicating completion of the action; in response to receiving the data indicating completion of the action, obtain additional thermostat information by performing a test of the HVAC system.

In some implementations, the method further includes the monitor control unit is further configured to perform the test by: determining a first amount of time for the HVAC system to raise a temperature of the property by a temperature amount and a second amount of time to lower the temperature of the property by the temperature amount; determining that the first amount of time satisfies a first time threshold; determining that the second amount of time satisfies a second time threshold; and in response to determining that the first amount of time satisfies the first time threshold and determining that the second amount of time satisfies the second time threshold, determining the error of the HVAC system has been fixed.

In some implementations, the method further includes the monitor control unit is further configured to perform the test by: determine a difference between a temperature of the property and a desired temperature of the property within a predetermined period; determine that the difference between the temperature of the property and the desired temperature of the property satisfies a temperature threshold within the predetermined period; and in response to determining that the difference between the temperature of the property and the desired temperature of the property satisfies the temperature threshold within the predetermined period, determine the error of the HVAC system has been fixed.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 is a flowchart of an example process for determining an HVAC system issue at the monitored property and alerting a customer of the HVAC system issue.

FIG. 4 is a flowchart of an example process for performing one or more thermostat tests to determine whether the HVAC system is working properly when the household is empty.

FIG. 5 is a flowchart of an example process for determining an error of the HVAC system and determining an action to likely correct the error of the HVAC system.

DETAILED DESCRIPTION

Figure 1:
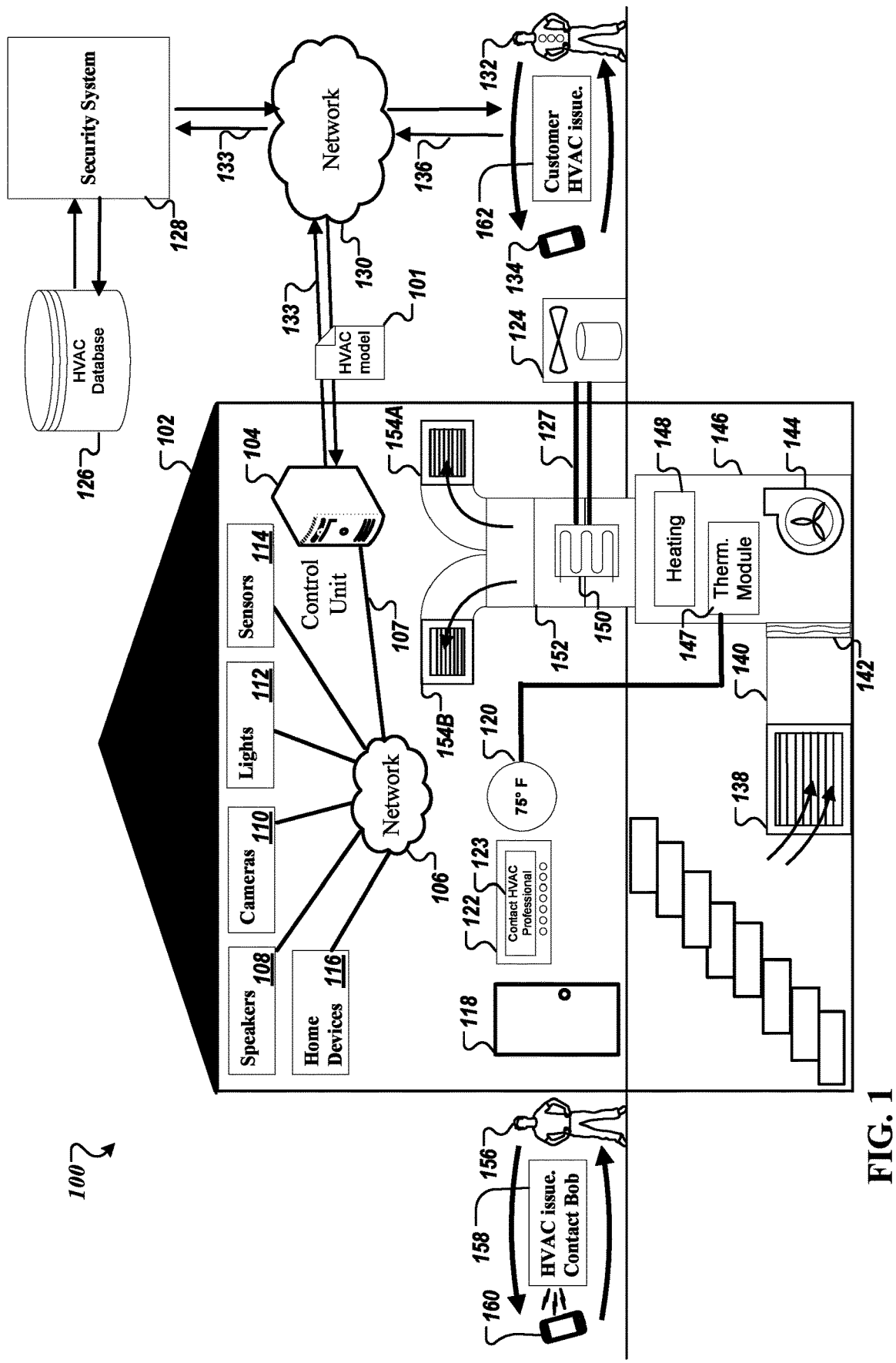
FIG. 1 is a contextual diagram of an example system for monitoring HVAC analytics in a monitored property.

FIG. 1 is a contextual diagram of an example system of an integrated security environment 100 for monitoring an HVAC system in a monitored property. Though system 100 is shown and described including a particular set of components including a control unit server 104, a network 106, speakers 108, camera 110, lights 112, sensors 114, home devices 116, air conditioner (or compressor) 124, HVAC system 146, network 130, communication links 133, communication links 136, security system 128, HVAC database 126, the present disclosure need not be so limited. For instance, in some implementations only a subset of the aforementioned components may be used by the integrated security environment for monitoring the control unit of the monitored property. As an example, there may be implementations that do not use the speakers 108. Similarly, there may be implementations that the security system 128 is stored in the control unit server 104. Yet other alternative exemplary systems also fall within the scope of the present disclosure such as a system that does not use a control unit server 104. For these reasons, the system 100 should not be viewed as limiting the present disclosure to any particular set of necessary components.

As shown in FIG. 1, a monitored property 102 owned by owner 156 is monitored by a control unit server 104 that includes components within the monitored property 102. The integrated security environment 100 further includes an alarm panel 122 with a message display 123, a thermostat 120, and an HVAC system 146, which includes a return air duct 138, air duct 140, an air filter 142, a blower 144, a thermostat module 147, a heating module 148, an evaporator coil 150, air handling unit 152, refrigerant filled tubing 127, and supply air grills 154A and 154B. The thermostat 120 displays a temperature to set the monitored property 102. The return air duct 138 is a duct to carry air from a conditioned air space, such as the monitored property 102 to the air duct 140. The air filter 142 is a porous device used to remove impurities or solid particles from the air that passes through the air duct 140. The blower 144 is a mechanical device that creates a current of air, such as with the use of a fan. The thermostat module 147 is a device used to receive commands from the thermostat 120 and convert the commands into instructions, instructing the HVAC system 146 to move the temperature of monitored property 102 to a set temperature set by the thermostat 102. The heating module 148 produces heat to provide to the monitored property 102. The evaporator coil 150 sits on top of the heating module 148 and is used to cool air inside the monitored property 102. For example, the heating element 148 provides warms the air provided by the blower 144 and passes the warm air to pass over the evaporator coil 150. The air provided by the heating element 148 cools as it passes over the evaporator coil 150 because heat from the air transfers to the refrigerant in the refrigerant filled tubing 127. The refrigerant filled tubing 127 circulates refrigerant between the outdoor compressor 124 and the evaporator coil 150. The air conditioner 124 removes heat from the refrigerant, supplies air or other gas at increased pressure for the HVAC system 146, and uses a fan to create a current of air. The air-handling unit 152 includes a device to condition and circulate air as part of heating, ventilating, and air-conditioning the HVAC system 146. The supply air grills 154A and 154B provided resultant air from the HVAC system 146 to particular rooms in the monitored property 102.

Additionally, the components within the monitored property 102 may include one or more speakers 108, one or more cameras 110, one or more lights 112, one or more sensors 114, and one or more home devices 116. The one or more cameras 110 may include video cameras that are located at the exterior of the monitored property 102 near the front door 118, as well as located at the interior of the monitored property 102 near the front door 118. For example, a video camera may be placed in the basement of the monitored property 102 for visually monitoring the HVAC system 146 and send the images or video to the control unit server 104 to send to a mobile device 160 owned by the owner 156. The one or more sensors 114 include a motion sensor located at the exterior of the monitored property 102, a front door sensor that is a contact sensor positioned at the front door 118, a pressure sensor that receives button presses at a light device, an air flow sensor included in the air duct 140 or the air handling unit 152, and a lock sensor that is positioned at the front door 118 and each window. The contact sensor may sense whether the front door 118 or the windows is in an open position or a closed position. The lock sensor may sense whether the front door 118 and each window is in an unlocked position or a locked position. The airflow sensor may sense whether air is flowing through the HVAC system 148 when turned on to either heat or cool the monitored property 102. The one or more home devices 116 may include home appliances such as a washing machine, a dryer, a dishwasher, an oven, a stove, a microwave, and a laptop, to name a few examples. The one or more home devices 116 may also include a humidity sensor that monitors for humidity effectiveness in each room of the monitored property 102. The control unit server 104 can adjust how much sun light is let in to the monitored property 102 by adjusting a movement of shades covering each of the windows in the monitored property 102. Additionally, should the monitored property 102 be a commercial facility, the one or more devices 116 may include a printer, a copier, a vending machine, and a fax machine to name a few examples.

The control unit server 104 communicates over a wired or wireless connection over network 106 with connected devices such as each of the one or more speakers 108, one or more cameras 110, one or more lights 112, one or more home devices 116 (washing machine, a dryer, a dishwasher, an oven, a stove, a microwave, a laptop, etc.), and one or more sensors 114 to receive sensor data descriptive of events detected by the one or more speakers 108, the one or more cameras 110, the one or more lights 112, and the one or more home devices 116 in the monitored property 102. In some implementations, the connected devices may connect via Wi-Fi, Bluetooth, or any other protocol used to communicate over network 106 to the control unit server 104. Additionally, the control unit server 104 communicates over a long-range wired or wireless connection with a security system 128 over network 130 via communication links 133. In some implementations, the security system 128 is located remotely from the monitored property 102, and manages the monitoring at the monitored property 102, as well as other (and, perhaps, many more) monitoring systems located at different monitored properties that are owned by various users. In other implementations, the security system 128 is located locally at the monitored property 102. The security system 128 communicates bi-directionally with the control unit server 104. Specifically, the security system 128 receives sensor data descriptive of events detected by the sensors included in the monitoring system of the monitored property 102. Additionally, the security system 128 transmits instructions of the control unit server 104 for particular events. In some implementations, the security system 128, which may be in a cloud network, and the control unit server 104, which may be local to the monitored property, can both perform the same functions.

Additionally, the security system 128 communicates with an HVAC database 126. The HVAC database 126 is composed of one or more data tables that comprises typical issues, such as failure data, associated with HVAC systems. Such issues may include broken components such as, broken thermostats, unresponsive burners, unresponsive air compressor, unresponsive air conditioner 124, lack of refrigerant in the refrigerant filled tubing 127, broken blower 144, broken evaporator coil 150, low battery power, to name a few examples. The HVAC database 126 may receive data indicating HVAC issues from the control unit server 104 at the monitored property 102 and other monitored properties with an HVAC system 146. Additionally, the HVAC database 126 may receive thermostat information associated with typical issues of broken HVAC systems. For example, the thermostat information may comprise a current temperature, an operating state of the thermostat, information based on changes of operating state of the thermostat such as when the thermostat is instructed to turn on and turn off, set points of the thermostat indicating target temperature, as well as outdoor temperature at the time of a broken HVAC system, and whether auxiliary heat is included in the household. Additionally, the thermostat information may include energy information associated with the HVAC system 146, a power usage associated with the HVAC system 146, a humidity level of the monitored property 102, and various temperature readings from around the monitored property 102. In order for the security system 128 to retrieve the outdoor temperature, the security system 128 may retrieve outdoor temperature and humidity information from an external website at a particular date and time when the HVAC system broke. Thermostat, sensor data, and outdoor weather information can be fed into the machine learning algorithm during training.

In some implementations, the security system 128 may train a machine-learning algorithm stored on the HVAC database 126 to detect and predict issues associated with the HVAC system 146. In other implementations, the control unit server 104 can train the machine-learning algorithm to detect and predict issues associated with the HVAC system 146. For example, the security system 128 may use a machine-learning algorithm such as a deep learning algorithm an anomaly detection algorithm, a linear regression algorithm, or a logistical regression algorithm, or a combination of various machine learning algorithms, to name a few examples. The security system 128 may provide each of the failure data obtained from broken HVAC systems to the machine learning algorithm for training. In some implementations, the failure data is provided with corresponding timestamp data to the machine learning algorithm for training. By adding corresponding timestamps to the failure data, the machine learning algorithm can be trained to predict likelihoods of failures at particular times of the day. The training is additionally based on HVAC systems that have similar performance. This makes the machine-learning algorithm detect issues for various HVAC systems, that may be agnostic, that include similar performances. For example, performances may include how long it takes to heat the monitored property 102 based on the run time of the HVAC system 146 or how long it takes to cool the monitored property 102.

The goal for the security system 128 in providing the machine learning algorithm the failed HVAC system data is that the trained machine learning algorithm will be able to detect and predict failures associated with the HVAC system 146. The machine learning algorithm will search for trends in the obtained data provided by the security system 134 for a likelihood that a failure might occur or has occurred. Additionally, the machine learning algorithm can provide an indication of an inefficiency associated with the HVAC system 146 that may lead to a failed HVAC system.

After sufficient data has been passed through the machine learning algorithm, the security system 128 returns a HVAC model 101 from the trained machine learning algorithm. The security system 128 can provide the HVAC model 101 to the control unit server 104 to run on top of the existing software on the control unit server 104. For example, the control unit server 104 can execute the HVAC model 101 to monitor the speakers 108, the cameras 110, the lights 112, the sensors 114, the home devices 116, the thermostat 120, and the HVAC system 146. In response, the HVAC model 101 executed on the control unit server 104 can predict and provide any failed or inefficient components associated with the HVAC system 146 to the owner 156 through the owner 156's mobile device 160. The HVAC model 101 can receive thermostat information such as current temperature of the thermostat, an operating state of the thermostat, information based on changes of operating state of the thermostat such as when the thermostat is instructed to turn on and turn off, set points of the thermostat indicating target temperature, as well as a current outdoor temperature to search for and detect patterns of a failed or inefficient component of an HVAC system 146. The benefit of using the HVAC model 101 to be trained by known broken HVAC systems is that the HVAC model 101 can provide an indication of a particular component that may be broken or inefficiently operating. Broken components may include the return air duct 138, air duct 140, the air filter 142, the blower 144, the thermostat module 147, the heating module 148, the evaporator coil 150, air handling unit 152, refrigerant filled tubing 127, and supply air grills 154A and 154B.

Additionally, the HVAC model 101 may run on the security system 128 to infer any additional health indication of the connected HVAC system 146 obtained from the control unit server 104. The security system 128 may input the thermostat information into the HVAC model 101. The HVAC model 101 can analyze the input thermostat information and determine based on analyzing trends associated with the input thermostat and the information used to train the HVAC model 101, whether an HVAC system issue 146 has occurred. The issue can include a failed component of the HVAC system 146 or an inefficient component of the HVAC system 146.

The benefit of having the HVAC model 101 run on the control unit server 104 and the security system 128 is to verify that both systems produce similar outputs when receiving obtained thermostat information. Should HVAC model 101 on the control unit server 104 detect a failure associated with the HVAC system 146 using the obtained thermostat information and the HVAC model 101 on the security system 128 does not detect a failure when both HVAC models 101 receive the same thermostat information from thermostat 120, the security system 128 and the control unit server 104 can communicate with one another to resolve the difference. In particular, the control unit server 104 can provide the detected HVAC failure and current thermostat information to the HVAC model 101 at the security system 128 via the network 130. The security system 128 can train its HVAC model 101 to detect that particular failure or inefficiency as detected by the HVAC model 101 at the control unit server 104. This functionality also works in the reverse, where the HVAC model 101 at the security system 128 detects a failure or inefficiency that the HVAC model 101 at the control unit server 104 does not detect.

In some implementations, the HVAC model 101 may run at the control unit server 104 and at the security system 128 when the owner 156 leaves the monitored property 102. In the example shown in FIG. 1, an owner 156 may prepare to leave the monitored property 102. In doing so, the owner 156 may turn off each of the one or more lights 112, turn off each of the one or more home devices 117, lock the front door 121, and close and lock each of the one or more windows. In some implementations, the owner 156 may interact with a client device 160 to activate a signature profile, such as "arm home" for the monitored property 102. The client device 160 may display a web interface, an application, or a device specific for a smart home system. The client device 160 can be, for example, a desktop computer, a laptop computer, a tablet computer, a wearable computer, a cellular phone, a smart phone, a music player, an e-book reader, a navigation system, a security panel, or any other appropriate computing device. In some implementations, the client device 160 may communicate with the control unit server 104 using the network 106 and one or more communication links 107. The network 106 may be wired or wireless or a combination of both and can include the Internet.

In some implementations, the owner 156 may communicate with the client device 160 to activate a signature profile for the monitored property 102. To illustrate, the owner 156 may first instruct the control unit server 104 to set a signature profile for arming the monitored property 102. For example, owner 156 may use a voice command to say "Smart Home, Arm Home." The voice command may include a phrase, such as "Smart Home" to trigger the client device 160 to actively listen to a command following the phrase. Additionally, the phrase "Smart Home" may be a predefined user configured term to communicate with the client device 160. The client device 160 can send the voice command to the control unit server 104 over the network 106, and the one or more communication links 107. The control unit server 104 may notify the security system 128 that monitored property 102 is to be armed. In addition, the control unit server 104 may set parameters to arm the monitored property 102 in response to receiving the voice command. Moreover, the control unit server 104 can send back a confirmation to the client device 160 in response to arming the monitored property 102 and setting the armed parameters. For example, the control unit server 104 may send back a response to display a message on the client device 160 that says "home armed."

The importance of setting the signature profile indicates to the control unit server 104 who to contact in case of the HVAC model 101 detecting an issue with one or more components of the HVAC system 146. For example, once the armed home signature profile is set, the control unit server 104 immediately sends a notification to the mobile device 160 of the owner 156. The indication signifies to the mobile device 160 to display a message to the owner 156 that an issue exists with the HVAC system 146 and to contact an HVAC technician. For example, the message 158 may indicate on the display of mobile device 160 "HVAC issue. Contact Bob," where Bob 132 is the HVAC technician. Alternatively, if the owner 156 is in the monitored property 102, then an owner may set a signature profile such as "Smart Home, Unarm Home." For example, when the unarmed home signature profile is set, the control unit server 104 immediately sends a notification to the mobile device 160 of the owner 156 to detect a particular component of the HVAC system 146. For example, the message 158 may indicate on the display of the mobile device 160 "Please check compressor for issues." The owner 156 may accept the notification by selecting a confirmation button on the mobile device, which sends a confirmation signal to the control unit server 104.

Additionally, upon the HVAC model 101's detection of a failure or an inefficient component associated with the HVAC system 146 at either the control unit server 104 or the security system 128, the control unit server 104 and the security system 128 may log the detection of the failure or the inefficient component along with a timestamp in memory. The control unit server 104 and the security system 128 may log every detection of a failure or inefficiency associated with the HVAC system 146 in a log file for retrieval later by Bob 132, the HVAC technician.

When the HVAC model 101 detects a failure or an inefficient component associated with the HVAC system 146, the control unit server 104 and the security system 128 take additional steps to further classify the detection. In some implementations, one additional step is to further sort the detection into one or more specific subcategories. For example, the categories may include heating vs. cooling category, acute vs. inefficient category, a filter change category, and a long cycling category. In some implementations, the heating vs. cooling category may comprise an issue associated with the HVAC system 146 not being able to properly heat or cool the monitored property 102. The heating vs. cooling category corresponds to the runtime per mode on the HVAC system 146. In particular, by exposing the average temperature, total runtime, and average cycle time of the system, additional inferences can be made by the security system 128 as to the severity and nature of the problem. For example, if two customers experience failing furnaces in their corresponding HVAC systems, and the temperature is 67 degrees Fahrenheit at one customer's location and the temperature is 62 degrees Fahrenheit at the other customer's location, it is likely that the location (i.e., house or monitored property) that has the temperature of 62 degrees Fahrenheit needs attention first.

Additionally, if the monitored property with the HVAC system 146 can maintain a comfortable temperature but the HVAC system 146 is running three times harder than is expected, the security system 128 can determine that the failure is not acute in nature, but in fact is incapable of treating the air the HVAC system 146 can be deemed to be inefficient. By analyzing this scenario, the security system 128 can help technicians rule out possible failure scenarios before technicians ever enter the monitored property. This determination also makes it possible for the security system 128 to communicate more effectively to customers because they will have more detailed context about the HVAC issue within their monitored property, and allow customers to make a more informed decision on how and when to address the HVAC issue.

The acute vs. inefficient category may comprise an issue associated with the HVAC system having a component that is not working at maximum efficiency or has failed completely, such as the blower 144. The filter change category may comprise an issue with the air quality passing through HVAC system 146 such that the filter 142 needs to be replaced or is not properly placed inside the HVAC system 146 and needs readjustment. The long cycling category may comprise extended periods of run time for the HVAC system 146 or a very short period of run time for the HVAC system 146. Additionally, the long cycling (or short cycling time) may be an indication when the HVAC system 146 heats the monitored property 102, yet, the temperature as indicated by the thermostat 120 is steadily dropping. In some implementations, short cycling can be the result of many undesirable states of an HVAC system. One undesirable state includes when the HVAC system 146 hits a fail-safe, triggering the HVAC system 146 to shut down before reaching a set point temperature, and resulting in rapid switching on/off of the HVAC system 146. Another undesirable state can include the oversizing of the HVAC system 146 for conditioning of the monitored property 102, poor placement of the thermostat in the monitored property 102, or improper user operation, to name a few examples.

Additionally, the control unit server 104 and the security system 128 may take additional steps following the classification of the detection. In some implementations, the control unit server 104 and the security system 128 take action according to the sorted subcategory. For example, the control unit server 104 and the security system 128 may issue an HVAC system shutoff to further await a fix. In other examples, the control unit server 104 and the security system 128 may issue a temperature setback to lower the temperature or perform a delta T test to measure the difference between the ambient temperature of the monitored property 102 and the measured temperature as indicated by thermostat 120. Additionally, the control unit server 104 and/or the security system 128 may issue a notification to the alarm panel 122 to display a message on the message display 123. For example, the message displayed via the message display 123 may read "Issue with the HVAC system. Please fix the evaporator coil. Contact Bob, the HVAC technician." Other messages are possible to be displayed by the message display 123 on the alarm panel 122. In another example, a connectivity test may be performed between the security system 128 and the control unit 104. For example, the control unit 104 and the security system 128 may send test data between one another to determine whether the connectivity between the two systems is sound by comparing the test data to known test data.

In another example, event rules are triggered in response to the detection. The owner 156 is immediately notified of the detection via the mobile device 160. For example, the owner 156 may be notified with push notifications, texts, emails, and panel messages displayed on the alarm panel 122. The owner 156 may be instructed to contact the HVAC technician 132 regarding the issue. In another example, the HVAC technician 132 may be notified via the network 130 at mobile device 134 after the security system 128 and the control unit server 104 log the detection in memory to fix the issue. Additionally, one or more lights 112 may change color when a detection of an issue occurs or a particular song may play through the speakers 108.

In another step following the classification of detection, the security system 128 may execute one or more filters to filter out false or false detections regarding the HVAC system 146. In particular, the security system 128 executes one or more filters on the input data to the HVAC model 101 and the output of the HVAC model 101. For example, the security system 128 provides the current thermostat information, the previous thermostat information, and the output of the HVAC model 101 into the one or more filters to determine whether the HVAC system 146 is healthy or broken. The one or more filters can be minimum runtime filters that can determine whether the HVAC system 146 is health or broken without a clear indication of whether the HVAC system 146 is broken. Additionally, the one or more filters can run for other HVAC systems at other monitored properties. These filters help with determining the efficacy of the HVAC model 101.

In some implementations, the security system 128 may execute another filter that determines whether the operating state of the HVAC system 146, the set point temperature of the HVAC system 146, the aggregate runtime, and the HVAC operating mode remain in sync during operation of the HVAC system 146. If three of these four data points are known by this filter at any time, the filter can infer the fourth data point. This filter for determining whether the HVAC system remains in sync is utilized before the HVAC model 101. Thus, if any of these four data points provided by the HVAC system 146 is contradictory, the filter will not provide the temperature information from the HVAC system 146 to the HVAC model 101 because the data is not reliable for a prediction. By providing this filter before the HVAC model 101, the efficacy of the HVAC model 101 is improved.

In some implementations, the security system 128 may provide a graph of historical HVAC performance associated with the HVAC system 146 to the HVAC technician 132. In particular, the graph of historical HVAC performance indicates to the HVAC technician 32 visualization data being obtained from the thermostat 120 included in the monitored property 102 and past indications of detected failed components of the HVAC system 146. For example, the graph may expose metrics derived from the HVAC system 146 to the HVAC technician 132 such as average heat cycle duration, average cool cycle duration, set run time for the thermostat, set point temperature, and an outdoor temperature setting. The graph may also overlay any additional flagged issue events, such as current detected failed or inefficient components associated with the HVAC system 146. In addition, the HVAC technician 132 may provide feedback to the security system 134 of other distinguished problems that the security system 128 can store in the HVAC database 126. For example, the HVAC technician 132 can provide an indication of an inefficient compressor 124 based on analyzing trends on the graph of historical HVAC performance. The indicators provided by the HVAC technician 132 to the security system 128 can be stored in the HVAC database 126 and used to train the HVAC model 101 for further detections of these indicators.

In some implementations, the graph of historical HVAC performance associated with the HVAC system 146 may display one or more customizable options for the HVAC technician 132. The one or more customizable options can include an indication to define a particular previous season to view on the graph in which the HVAC system 146 performed. For example, the HVAC technician 132 may set the graph to show the performance of the HVAC system 146 during the summer time because of an increase likelihood of a heating issue. Additionally, another customizable option includes defining a range that includes a start time and an end time to view performance of the HVAC system 146 during the defined range on the displayed graph. Another customizable option includes defining which specific issues corresponding to the HVAC system 146 which to view on the graph.

In some implementations, the security system 134 may obtain thermostat information from the monitored property 102 to determine whether the HVAC system 146 has been fixed. In particular, once the HVAC technician 132 or another HVAC technician has performed a fix on the HVAC system 146 as indicated by the detected failure event, the control unit server 104 may obtain thermostat information from the thermostat 120 to determine whether the HVAC system 146 has been fixed. For example, the HVAC model 101 may indicate no detected failure or inefficient component in the HVAC system 146 after receiving thermostat information from thermostat 120 over a particular period of time, such as a day, once the HVAC technician 132 fixes the HVAC system 146. By providing a no detected failure or inefficient component over a particular period of time, the HVAC model 101 becomes more robust to external factors such as end-user behavior or changing outdoor weather patterns that likely have little bearing on the HVAC system 146's performance, but could generate deceiving model results for short periods of time. The HVAC technician 132 may shut off the HVAC system 146 during maintenance and turn the HVAC system 146 back on after completion, at which the HVAC model 101 may start to receive thermostat information. While the HVAC system 146 is shut off, the HVAC model 101 may not receive any thermostat information.

In some implementations, the security system 134 may test whether the HVAC system 146 is properly working when owner 156 is away from the monitored property 102. In particular, when the armed home signature profile is set, this indicates to the control unit server 104 that the owner 156 is away from the monitored property 102. Additionally, the security system 128 may instruct the control unit server 104 to run specific tests to test whether the HVAC system is properly working. For example, the control unit server 104 may be instructed to increase the temperature of the monitored property to 85 degrees Fahrenheit and then down to 45 degrees Fahrenheit. The control unit server 104 may determine an amount of time it took for the HVAC system 104 to raise and lower the temperature of the HVAC system 146 to see if it falls within a reasonable threshold. If the test falls outside a threshold, such as the period took an entire day, then the security system 128 may notify owner 156 that the HVAC system 146 is not working properly. Additionally, the security system 132 may perform tests, such as shutting the HVAC system 146 off and on, measuring a difference between the desired temperature set by the thermostat and the actual temperature in the monitored property 102. If the difference between the desired the desired temperature set by the thermostat and the actual temperature in the monitored property 102 falls within a threshold, such as 1 degree Fahrenheit, then the HVAC system 146 is functioning as desired. In the event that the HVAC system 146 is functioning as desired, the security system 128 may notify owner 156 that the HVAC system 146 is functioning properly. The security system 128 may communicate with the owner 156 through the mobile device 160 or by sending a message through the alarm panel 122 to display via message display 123 upon return of the owner 156.

FIG. 2 is a flowchart of an example process 200 for determining an HVAC system issue at the monitored property and alerting a customer of the HVAC system issue. Generally, the process 200 includes obtaining thermostat information from a household; determining an HVAC system issue based on an analysis of the thermostat information using a trained model; sorting the HVAC issue into a category that specifies a type of the HVAC system issue; alerting the customer of the HVAC issue and taking additional actions based on the sorted category; alerting a dealer of the HVAC issue; and, obtaining thermostat information from the household indicating that the HVAC system issue has been fixed.

During 202, the control unit server 104 obtains thermostat information from the monitored property 102. In some implementations, the HVAC model 101 included in the current unit server 104 can obtain thermostat information from the monitored property 102. For example, the HVAC model 101 can receive thermostat information such as current temperature of the thermostat, an operating state of the thermostat, information based on changes of operating state of the thermostat such as when the thermostat is instructed to turn on and turn off, setpoints of the thermostat indicating temperature, as well as a current outdoor temperature.

During 204, the control unit server 104 determines an HVAC system issued based on an analysis of the thermostat information using a trained model. In some implementations, the control unit server 104 may input the obtained thermostat information into the HVAC model 101. For example, The HVAC model 101 can analyze the input thermostat information and determine based on analyzing trends associated with the input thermostat and the information used to train the HVAC model 101, whether an HVAC system issue 146 has occurred. The issue can include a failed component of the HVAC system 146 or an inefficient component of the HVAC system 146.

During 206, the control unit server 104 sorts the HVAC system issue into a category that specifies a type of the HVAC system issue. In some implementations, the categories may include heating vs. cooling category, acute vs inefficient category, a filter change category, and a long cycling category. For example, should the HVAC model 101 indicate a likelihood that the filter 142 needs to be replaced, the control unit server 104 may categorize the likelihood that the filter 142 needs to be replaced in the filter change category.

During 208, the control unit server 104 alerts the customer of the HVAC system issue and takes additional action based on the sorted category. In some implementations, the owner 156 may be notified via the mobile device in response to the detecting being sorted into the specific category. For example, the owner 156 may be notified with push notifications, texts, emails, and panel messages displayed on the alarm panel 122. The owner 156 may be instructed to contact the HVAC technician 132 regarding the issue.

During 210, the control unit server 104 alerts the dealer of the HVAC system issue. For example, the HVAC technician 132 may be notified via the network 130 at mobile device 134 after the security system 128 and the control unit server 104 log the detection in memory.

During 212, the control unit server 104 obtains thermostat information from the monitored property 102 indicating that the HVAC system 146 has been fixed. In some implementations, once the HVAC technician 132 or another HVAC technician has performed a fix on the HVAC system 146 as indicated by the detected failure event, the control unit server 104 may obtain thermostat information from the thermostat 120 to determine whether the HVAC system 146 has been fixed. For example, the HVAC model 101 may indicate no detected failure or inefficient component in the HVAC system 146 after receiving thermostat information from thermostat 120 over a particular period of time, such as a day, once the HVAC technician 132 fixes the HVAC system 146.

Figure 3:
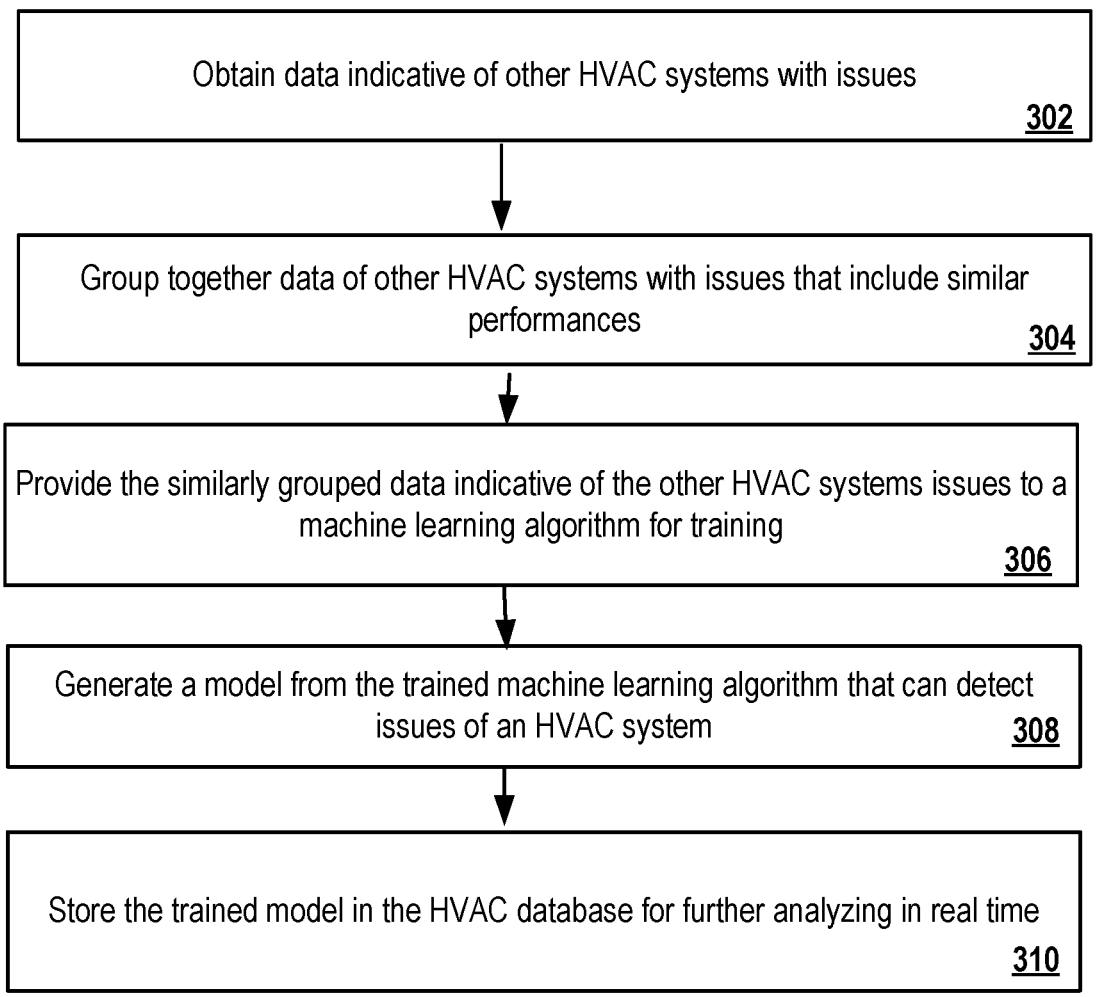
FIG. 3 is a flowchart of an example process for generating a model from a machine learning algorithm that can detect issues of an HVAC system.

FIG. 3 is a flowchart of an example process 300 for generating a model from a machine learning algorithm that can detect issues of an HVAC system. Generally, the process 300 includes obtaining data indicative of other HVAC systems with issues; grouping together data of other HVAC systems with issues that include similar performances; providing the similarly grouped data indicative of the other HVAC system issues to a machine learning algorithm for training; generating a model from the machine learning algorithm that can detect issues associated with an HVAC system; and, storing the trained model in the HVAC database for further analyzing in real time.

During 302, the security system 134 obtains data indicative of other HVAC systems with issues. In some implementations, the security system 128 communicates with an HVAC database 126. The HVAC database 126 is composed of one or more data tables that comprises typical issues, such as failure data, associated with HVAC systems. Such issues may include broken components such as: broken thermostats, unresponsive burners, unresponsive air conditioner 124, lack of refrigerant in the refrigerant filled tubing 127, broken blower 144, broken evaporator coil 150, low battery power, and others.

During 304, the security system 134 groups together data of other HVAC systems with issues that include similar performances. In some implementations, the training is additionally based on HVAC systems that have similar performance. This makes the machine learning algorithm detect issues for agnostic HVAC systems that include similar performances. For example, performances may include how long it takes to heat the monitored property 102 based on the run time of the HVAC system 146 or how long it takes to cool the monitored property 102.

During 306, the security system 134 provides the similarly grouped data indicative of the other HVAC system issues to a machine learning algorithm for training at the HVAC database 126. For example, the security system 128 may use a machine learning algorithm such as a deep learning algorithm, an anomaly detection algorithm, a linear regression algorithm, or a logistical regression algorithm, or a combination of various machine learning algorithms, to name a few examples. The security system 128 may provide each of the failure data obtained from broken HVAC systems that have similar performances to the machine learning algorithm for training.

During 308, the security system 134 generates a model from the trained machine learning algorithm that can detect issues of an HVAC system. In some implementations, after sufficient data has been passed through the machine learning algorithm, the security system 128 returns a HVAC model 101 from the trained machine learning algorithm. The security system 128 can provide the HVAC model 101 to the control unit server 104 to run on top of the existing software on the control unit server 104.

During 310, the security system 134 stores the model from the trained machine learning algorithm in the HVAC database 126 for further analyzing in real time. The security system 134 can provide the HVAC model 101 to the control unit server 104 to run on top of the existing software on the control unit server 104. Additionally, the HVAC model 101 may run on the security system 128 to infer any additional health indication of the connected HVAC system 146 obtained from the control unit server 104. The benefit of having the HVAC model 101 run on the control unit server 104 and the security system 128 is to verify that both systems produce similar outputs when receiving obtained thermostat information.

FIG. 4 is a flowchart of an example process 400 for performing one or more thermostat tests to determine whether the HVAC system 146 is working properly when the household is empty. Generally, the process 400 includes determining that one or more individuals are not located in a household using one or more sensors in the household; performing one or more thermostat tests to determine whether the HVAC is properly working; obtaining thermostat information in response to performing the one or more thermostat tests; analyzing the thermostat information to determine whether the HVAC is properly working; and, providing an indication to the user indicating whether the HVAC is properly working.

During 402, the control unit server 104 determines that one or more individuals are not located in the monitored property 102 using one or more sensors in the monitored property 102. For example, the motion detectors in the sensors 114 may not report any movement to the control unit server 104 inside the monitored property 102. Additionally, when the armed home signature profile is set, the home signature profile indicates to the control unit server 104 that the owner 156 is away from the monitored property 102.

During 404, the control unit server 104 performs one or more thermostat tests to determine whether the HVAC system is properly working. In some implementations, the security system 128 may instruct the control unit server 104 to run specific tests to test whether the HVAC system is properly working. For example, the control unit server 104 may be instructed to increase the temperature of the monitored property to 85 degrees Fahrenheit and then down to 45 degrees Fahrenheit.

During 406, the control unit server 104 may obtain thermostat information in response to performing the one or more thermostat tests. For example, the HVAC model 101 may receive thermostat information such as a current temperature, an operating state of the thermostat, information based on changes of operating state of the thermostat such as when the thermostat is instructed to turn on and turn off, setpoints of the thermostat indicating target temperature, as well as outdoor temperature.

During 408, the control unit server 104 may analyze the thermostat information to determine whether the HVAC system 146 is properly working. For example, the control unit server 104 may determine an amount of time it took for the HVAC system 104 to raise and lower the temperature of the HVAC system 146 to see if it falls within a reasonable threshold. Additionally, the security system 134 may perform tests, such as cycling the HVAC system 146 off and on, measuring a difference between the desired temperature set by the thermostat and the actual temperature in the monitored property 102.

During 410, the control unit server 104 may provide an indication to the owner 156 indicating whether the HVAC system 146 is properly working. For example, in the event that the HVAC system 146 is working as desired, the security system 128 may notify owner 156 that the HVAC system 146 is working properly. The security system 128 may communicate with the owner 156 through the mobile device 160 or by sending a message through the alarm panel 122 to display via message display 123 upon return of the owner 156.

FIG. 5 is a flowchart of example process 500 for determining an error of the HVAC system 146 and determining an action to likely correct the error of the HVAC system 146. Generally, the process 500 includes receiving, from a thermostat, thermostat data that indicates activity of the HVAC system 146 and temperature history of a property; receiving, from the one or more sensors, sensor data; applying, to an HVAC model that is trained using past sensor data, past thermostat data, past errors of the HVAC system 146, and past actions that corrected the errors of the HVAC system, the first thermostat data and the sensor data; based on applying the thermostat data and the sensor data to the HVAC model, determining an error of the HVAC system 146; based on the error of the HVAC system 146, determining an action for likely correcting the error of the HVAC system 146; and, providing, for output, data identifying the error of the HVAC system 146 and the action for likely correcting the error of the HVAC system 146.

During 502, the control unit server 104 receives thermostat data from a thermostat, such as thermostat 120, which indicates activity of the HVAC system 146 and temperature history of a property. For example, the thermostat data can include current temperature of the thermostat 120, an operating state of the thermostat 120, information based on changes of operating state changes of operating state of the thermostat 120 such as when the thermostat 120 is instructed to turn on and turn off, set points of the thermostat indicating target temperature, as well as current outdoor temperature to search for and detect patterns of a failed or inefficient component of the HVAC system 146. Additionally, the control unit server 104 can receive energy information associated with the HVAC system 146, a power usage associated with the HVAC system 146, a humidity level of the property, such as a monitored property 102, and various temperature readings from around the monitored property 102.

During 504, the control unit server 104 receives sensor data from one or more sensors 114. In particular, the control unit server 104 receives sensor data descriptive of events detected by the one or more speakers 108, the one or more cameras 110, the one or more lights 112, and the one or more home devices 116 in the monitored property 102. For example, the control unit server 104 can receive motion data from motion sensors in the sensors 114. Additionally, the control unit server 104 can receive proximity data from proximity sensors in the sensors 114.

During 506, the control unit server 104 applies the thermostat data and the sensor data to an HVAC model 101 that is trained using past sensor data, past thermostat data, past errors of the HVAC system 146, and past actions that corrected the errors of the HVAC system 146. The control unit server 104 retrieves thermostat information, outdoor temperature information, humidity information, and sensor data information to train a machine learning algorithm. The control unit server 104 can train the machine learning algorithm to detect and predict issues associated with the HVAC system 146. In particular, the machine learning algorithm can be trained with past sensor data from the sensors 114, past thermostat data from the thermostat 120, past errors logged by the HVAC system 146, and past action that corrected the errors of the HVAC system 146. The past sensor data can include indications that cause the HVAC system 146 to strain use. For example, the past sensor data can indicate that one or more windows are open in the monitored property 102 for a long period of time. The control unit server 104 can add in an indication to the past sensor data that indicates to closing the window will fix the HVAC system issue. In another example, the front door and the garage door can be open for too long, which may cause a strain on the HVAC system 146 and not allow the HVAC system 146 to keep the monitored property 102 set to a desired temperature. The control unit server 104 can also indicate in the past sensor data to close the door and the garage door as a fix to this problem. Another example can include the past sensor data recognizing a large amount of movement in the monitored property 102 at the same time indicating that many people are in the monitored property 102, which creates more heat and does not allow the HVAC system 146 to properly keep the monitored property 102 set to a desired temperature. As such, the control unit server 104 can provide an indication in the past sensor data to indicate for some of the users to leave the monitored property 102 or disperse to other areas of the monitored property. The past sensor data may also rely on camera and or audio data to determine that a particular room in the monitored property 102 is overcrowded with individuals. The control unit server 104 can also rely on other data to train the machine learning algorithm.

The control unit server 104 can provide past errors logged by the HVAC system 146 and include inefficiencies with the HVAC system 146 to train the machine learning algorithm. This can include examples such as broken thermostats, unresponsive burners, unresponsive air conditioners, lack of refrigerant in the refrigerant filled tubing, a broken blower, a broken evaporator coil, and a low battery power, to name a few examples. The past actions that corrected the errors of the HVAC system 146 include actions taken by the HVAC technician 132 to fix the HVAC system 146. For example, for a broken thermostat, the HVAC technician 132 replaces the broken thermostat. In another example, for the lack of refrigerant in the refrigerant filled tubing, the HVAC technician 132 fills the refrigerant in the tubing of the HVAC system 146. In another example, the HVAC technician 132 can replace the burner for an issue in the heating vs. cooling category. In another example, the HVAC technician 132 can replace an air filter for an issue in the filter change category. In another example, the HVAC technician 132 can move a poorly placed thermometer to a different location to better sense the overall house temperature for an issue in the long cycling category. In another example, the HVAC technician 132 can replace a blower for an issue in the acute vs. inefficient category. The HVAC model 101 is then trained on the methodologies used by the HVAC technicians to fix the HVAC system 146.

In some implementations, the control unit server 104 may input the obtained thermostat information into the HVAC model 101. For example, the HVAC model 101 can analyze the input thermostat information and determine based on analyzing trends associated with the input thermostat and the information used to train the HVAC model 101, whether an HVAC system issue 146 has occurred. The issue can include a failed component of the HVAC system 146 or an inefficient component of the HVAC system 146.

During 508, the control unit server 104 determines an error of the HVAC system 146 based on applying the thermostat data and the sensor data the HVAC model 101. In particular, the control unit server 104 sorts the output of the HVAC model 101 into a category that specifies a type of the HVAC system issue. In some implementations, the categories may include heating vs. cooling category, acute vs inefficient category, a filter change category, and a long cycling category. For example, should the HVAC model 101 indicate a likelihood that the filter 142 needs to be replaced, the control unit server 104 may categorize the likelihood that the filter 142 needs to be replaced in the filter change category.

During 510, the control unit server 104 determines an action for likely correcting the error of the HVAC system 146 based on the error of the HVAC system 146. Based on the control unit server 104's decision to sort the HVAC system issue into a category that specifies a type of the HVAC system issue, the control unit server 104 takes additional actions based on the sorted category. For example, for a filter change category, the control unit system 104 generates an indication to provide to the owner 156 to replace the filter. In another example, for the heating vs. cooling, acute vs. inefficient, and long cycling categories, the control unit system 104 generates an indication to provide to the HVAC technician 132.

During 512, the control unit server 104 provides, for output, data identifying the error of the HVAC system 146 and the action for likely correcting the error of the HVAC system 146. Continuing with the example from 510, the control unit server 104 alerts the customer of the HVAC system issue and takes additional action based on the sorted category. In some implementations, the owner 156 may be notified via the mobile device in response to the detecting being sorted into the specific category. For example, the owner 156 may be notified with push notifications, texts, emails, and panel messages displayed on the alarm panel 122. The owner 156 may be instructed to contact the HVAC technician 132 regarding the issue. Additionally, the control unit server 104 alerts the customer of the HVAC system issue and takes additional action based on the sorted category. In some implementations, the owner 156 may be notified via the mobile device in response to the detecting being sorted into the specific category. For example, the owner 156 may be notified with push notifications, texts, emails, and panel messages displayed on the alarm panel 122. The owner 156 may be instructed to contact the HVAC technician 132 regarding the issue.

Figure 6:
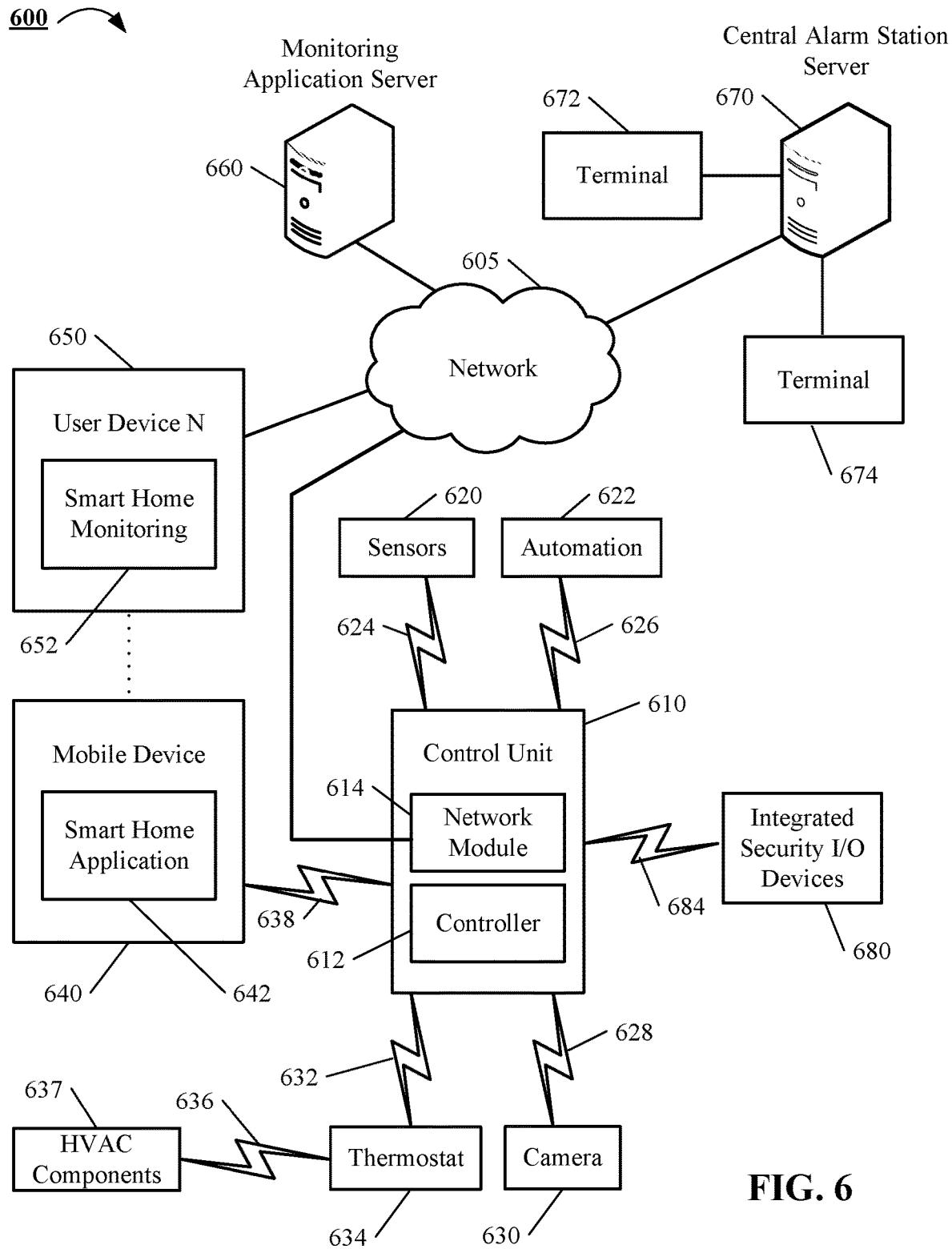
FIG. 6 is a block diagram of an example of a home monitoring system that may utilize various components to monitor an HVAC.

FIG. 6 is a block diagram of an example of a home monitoring system 600 that may utilize various components to monitor an HVAC 146. The HVAC system 600 includes a network 605, a control unit server 610, one or more user devices 640 and 650, a monitoring application server 660, and a central alarm station server 670. In some examples, the network 605 facilitates communications between the control unit server 610, the one or more user devices 640 and 650, the monitoring application server 660, and the central alarm station server 670.

The network 605 is configured to enable exchange of electronic communications between devices connected to the network 605. For example, the network 605 may be configured to enable exchange of electronic communications between the control unit server 610, the one or more user devices 640 and 650, the monitoring application server 660, and the central alarm station server 670. The network 605 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 605 may include multiple networks or subnetworks, each of which may include, for example, a wired or wireless data pathway. The network 605 may include a circuit-switched network, a packet-switched data network, or any other network able to carry electronic communications (e.g., data or voice communications). For example, the network 605 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 605 may include one or more networks that include wireless data channels and wireless voice channels. The network 605 may be a wireless network, a broadband network, or a combination of networks including a wireless network and a broadband network.

The control unit server 610 includes a controller 612 and a network module 614. The controller 612 is configured to control an HVAC system that includes the control unit server 610. In some examples, the controller 612 may include a processor or other control circuitry configured to execute instructions of a program that controls operation of an HVAC system. In these examples, the controller 612 may be configured to receive input from sensors, thermostats, or other devices included in the HVAC system and control operations of devices included in the household (e.g., a shower head, a faucet, a dishwasher, etc.). For example, the controller 612 may be configured to control operation of the network module 614 included in the control unit server 610.

The network module 614 is a communication device configured to exchange communications over the network 605. The network module 614 may be a wireless communication module configured to exchange wireless communications over the network 605. For example, the network module 614 may be a wireless communication device configured to exchange communications over a wireless data channel and a wireless voice channel. In this example, the network module 614 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 614 also may be a wired communication module configured to exchange communications over the network 605 using a wired connection. For instance, the network module 614 may be a modem, a network interface card, or another type of network interface device. The network module 614 may be an Ethernet network card configured to enable the control unit server 610 to communicate over a local area network and/or the Internet. The network module 614 also may be a voiceband modem configured to enable the alarm panel to communicate over the telephone lines of Plain Old Telephone Systems (POTS).

The HVAC system that includes the control unit server 610 includes one or more sensors. For example, the monitoring system may include multiple sensors 620. The sensors 620 may include a temperature sensor, a humidity sensor, a leaking sensor, or any other type of sensor included in an HVAC system 146. The sensors 620 also may include an environmental sensor, such as a temperature sensor, a water sensor, a rain sensor, a wind sensor, a light sensor, a smoke detector, a carbon monoxide detector, an air quality sensor, etc. The sensors 620 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 620 may include a radio-frequency identification (RFID) sensor that identifies a particular article that includes a pre-assigned RFID tag.

The control unit server 610 communicates with the automation module 622 and the camera 630 to perform monitoring. The automation module 622 is connected to one or more devices that enable home automation control. For instance, the automation module 622 may be connected to one or more lighting systems and may be configured to control operation of the one or more lighting systems. Also, the automation module 622 may be connected to one or more electronic locks at the property and may be configured to control operation of the one or more electronic locks (e.g., control Z-Wave locks using wireless communications in the Z-Wave protocol. Further, the automation module 622 may be connected to one or more appliances at the property and may be configured to control operation of the one or more appliances. The automation module 622 may include multiple modules that are each specific to the type of device being controlled in an automated manner. The automation module 622 may control the one or more devices based on commands received from the control unit server 610. For instance, the automation module 622 may cause a lighting system to illuminate an area to provide a better image of the area when captured by a camera 630.

The camera 630 may be a video/photographic camera or other type of optical sensing device configured to capture images. For instance, the camera 630 may be configured to capture images of an area within a building or within a HVAC system monitored by the control unit server 610. The camera 630 may be configured to capture single, static images of the area and also video images of the area in which multiple images of the area are captured at a relatively high frequency (e.g., thirty images per second). The camera 630 may be controlled based on commands received from the control unit server 610.

The camera 630 may be triggered by several different types of techniques. For instance, a Passive Infra-Red (PIR) motion sensor may be built into the camera 630 and used to trigger the camera 630 to capture one or more images when motion is detected. The camera 630 also may include a microwave motion sensor built into the camera and used to trigger the camera 630 to capture one or more images when motion is detected. The camera 630 may have a "normally open" or "normally closed" digital input that can trigger capture of one or more images when external sensors (e.g., the sensors 620, PIR, door/window, etc.) detect motion or other events. In some implementations, the camera 630 receives a command to capture an image when external devices detect motion or another potential alarm event. The camera 630 may receive the command from the controller 612 or directly from one of the sensors 620.

In some examples, the camera 630 triggers integrated or external illuminators (e.g., Infra-Red, Z-wave controlled "white" lights, lights controlled by the module 622, etc.) to improve image quality when the scene is dark. An integrated or separate light sensor may be used to determine if illumination is desired and may result in increased image quality.

The camera 630 may be programmed with any combination of time/day schedules, system "arming state", or other variables to determine whether images should be captured or not when triggers occur. The camera 630 may enter a low-power mode when not capturing images. In this case, the camera 630 may wake periodically to check for inbound messages from the controller 612. The camera 630 may be powered by internal, replaceable batteries if located remotely from the control unit server 610. The camera 630 may employ a small solar cell to recharge the battery when light is available. Alternatively, the camera 630 may be powered by the controller's 612 power supply if the camera 630 is co-located with the controller 612.

In some implementations, the camera 630 communicates directly with the monitoring application server 660 over the Internet. In these implementations, image data captured by the camera 630 does not pass through the control unit server 610 and the camera 630 receives commands related to operation from the monitoring application server 660.

The system 600 also includes thermostat 634 to perform dynamic environmental control at the property. The thermostat 634 is configured to monitor temperature and/or energy consumption of an HVAC system associated with the thermostat 634, and is further configured to provide control of environmental (e.g., temperature) settings. In some implementations, the thermostat 634 can additionally or alternatively receive data relating to activity at a property and/or environmental data at a property, e.g., at various locations indoors and outdoors at the property. The thermostat 634 can directly measure energy consumption of the HVAC system associated with the thermostat, or can estimate energy consumption of the HVAC system associated with the thermostat 634, for example, based on detected usage of one or more components of the HVAC system associated with the thermostat 634. The thermostat 634 can communicate temperature and/or energy monitoring information to or from the control unit server 610 and can control the environmental (e.g., temperature) settings based on commands received from the control unit server 610.

In some implementations, the thermostat 634 is a dynamically programmable thermostat and can be integrated with the control unit server 610. For example, the dynamically programmable thermostat 634 can include the control unit server 610, e.g., as an internal component to the dynamically programmable thermostat 634. In addition, the control unit server 610 can be a gateway device that communicates with the dynamically programmable thermostat 634.

A module 637 is connected to one or more components of an HVAC system associated with a property, and is configured to control operation of the one or more components of the HVAC system. In some implementations, the module 637 is also configured to monitor energy consumption of the HVAC system components, for example, by directly measuring the energy consumption of the HVAC system components or by estimating the energy usage of the one or more HVAC system components based on detecting usage of components of the HVAC system. The module 637 can communicate energy monitoring information and the state of the HVAC system components to the thermostat 634 and can control the one or more components of the HVAC system based on commands received from the thermostat 634.

The system 600 further includes one or more integrated security devices 680. The one or more integrated security devices may include any type of device used to provide alerts based on received sensor data. For instance, the one or more control units 610 may provide one or more alerts to the one or more integrated security input/output devices. Additionally, the one or more control units 610 may receive one or more sensor data from the sensors 620 and determine whether to provide an alert to the one or more integrated security input/output devices 680.

The sensors 620, the module 622, the camera 630, the thermostat 634, and the integrated security devices 680 communicate with the controller 612 over communication links 624, 626, 628, 632, 684, and 686. The communication links 624, 626, 628, 632, 684, and 686 may be a wired or wireless data pathway configured to transmit signals from the sensors 620, the module 622, the camera 630, the thermostat 634, and the integrated security devices 680 to the controller 612. The sensors 620, the module 622, the camera 630, the thermostat 634, and the integrated security devices 680 may continuously transmit sensed values to the controller 612, periodically transmit sensed values to the controller 612, or transmit sensed values to the controller 612 in response to a change in a sensed value.

The communication links 624, 626, 628, 632, 684, and 686 may include a local network. The sensors 620, the module 622, the camera 630, the thermostat 634, and the integrated security devices 680 and the controller 612 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 6 (CAT5) or Category 6 (CAT6) wired Ethernet network. The local network may be a mesh network constructed based on the devices connected to the mesh network.

The monitoring application server 660 is an electronic device configured to provide monitoring services by exchanging electronic communications with the control unit server 610, the one or more user devices 640 and 650, and the central alarm station server 670 over the network 605. For example, the monitoring application server 660 may be configured to monitor events (e.g., alarm events) generated by the control unit server 610. In this example, the monitoring application server 660 may exchange electronic communications with the network module 614 included in the control unit server 610 to receive information regarding events (e.g., HVAC control events) detected by the control unit server 610. The monitoring application server 660 also may receive information regarding events (e.g., HVAC events) from the one or more user devices 640 and 650.

In some examples, the monitoring application server 660 may route HVAC data received from the network module 614 or the one or more user devices 640 and 650 to the central alarm station server 670. For example, the monitoring application server 660 may transmit the HVAC data to the central alarm station server 670 over the network 605.

The monitoring application server 660 may store sensor and image data received from the monitoring system and perform analysis of sensor and image data received from the monitoring system. Based on the analysis, the monitoring application server 660 may communicate with and control aspects of the control unit server 610 or the one or more user devices 640 and 650.

The central alarm station server 670 is an electronic device configured to provide alarm monitoring service by exchanging communications with the control unit server 610, the one or more mobile devices 640 and 650, and the monitoring application server 660 over the network 605. For example, the central alarm station server 670 may be configured to monitor HVAC events generated by the control unit server 610. In this example, the central alarm station server 670 may exchange communications with the network module 614 included in the control unit server 610 to receive information regarding HVAC events detected by the control unit server 610. The central alarm station server 670 also may receive information regarding HVAC events from the one or more mobile devices 640 and 650 and/or the monitoring application server 660.

The central alarm station server 670 is connected to multiple terminals 672 and 674. The terminals 672 and 674 may be used by operators to process HVAC events. For example, the central alarm station server 670 may route HVAC data to the terminals 672 and 674 to enable an operator to process the HVAC data. The terminals 672 and 674 may include general-purpose computers (e.g., desktop personal computers, workstations, or laptop computers) that are configured to receive HVAC data from a server in the central alarm station server 670 and render a display of information based on the HVAC data. For instance, the controller 612 may control the network module 614 to transmit, to the central alarm station server 670, HVAC data indicating that a sensor 620 detected a flow rate of air in the air handling unit 152. The central alarm station server 670 may receive the HVAC data and route the HVAC data to the terminal 672 for processing by an operator associated with the terminal 672. The terminal 672 may render a display to the operator that includes information associated with the HVAC event (e.g., the flow rate, the air duct the flow rate came from, the temperature of the air in the air duct, etc.) and the operator may handle the HVAC event based on the displayed information.

In some implementations, the terminals 672 and 674 may be mobile devices or devices designed for a specific function. Although FIG. 6 illustrates two terminals for brevity, actual implementations may include more (and, perhaps, many more) terminals.

The one or more user devices 640 and 650 are devices that host and display user interfaces. For instance, the user device 640 is a mobile device that hosts one or more native applications (e.g., the smart home application 642). The user device 640 may be a cellular phone or a non-cellular locally networked device with a display. The user device 640 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 640 may perform functions unrelated to the monitoring system, such as placing personal telephone calls, playing music, playing video, displaying pictures, browsing the Internet, maintaining an electronic calendar, etc.

The user device 640 includes a smart home application 642. The smart home application 642 refers to a software/firmware program running on the corresponding mobile device that enables the user interface and features described throughout. The user device 640 may load or install the smart home application 642 based on data received over a network or data received from local media. The smart home application 642 runs on mobile devices platforms, such as iPhone, iPod touch, Blackberry, Google Android, Windows Mobile, etc. The smart home application 642 enables the user device 640 to receive and process image and sensor data from the monitoring system.

The user device 650 may be a general-purpose computer (e.g., a desktop personal computer, a workstation, or a laptop computer) that is configured to communicate with the monitoring application server 660 and/or the control unit server 610 over the network 605. The user device 650 may be configured to display a smart home user interface 652 that is generated by the user device 650 or generated by the monitoring application server 660. For example, the user device 650 may be configured to display a user interface (e.g., a web page) provided by the monitoring application server 660 that enables a user to perceive images captured by the camera 630 and/or reports related to the monitoring system. Although FIG. 6 illustrates two user devices for brevity, actual implementations may include more (and, perhaps, many more) or fewer user devices.

In some implementations, the one or more user devices 640 and 650 communicate with and receive monitoring system data from the control unit server 610 using the communication link 638. For instance, the one or more user devices 640 and 650 may communicate with the control unit server 610 using various local wireless protocols such as Wi-Fi, Bluetooth, Zwave, Zigbee, HomePlug (ethernet over powerline), or wired protocols such as Ethernet and USB, to connect the one or more user devices 640 and 650 to local security and automation equipment. The one or more user devices 640 and 650 may connect locally to the monitoring system and its sensors and other devices. The local connection may improve the speed of status and control communications because communicating through the network 605 with a remote server (e.g., the monitoring application server 660) may be significantly slower.

Although the one or more user devices 640 and 650 are shown as communicating with the control unit server 610, the one or more user devices 640 and 650 may communicate directly with the sensors and other devices controlled by the control unit server 610. In some implementations, the one or more user devices 640 and 650 replace the control unit server 610 and perform the functions of the control unit server 610 for local monitoring and long range/offsite communication.

In other implementations, the one or more user devices 640 and 650 receive monitoring system data captured by the control unit server 610 through the network 605. The one or more user devices 640, 650 may receive the data from the control unit server 610 through the network 605 or the monitoring application server 660 may relay data received from the control unit server 610 to the one or more user devices 640 and 650 through the network 605. In this regard, the monitoring application server 660 may facilitate communication between the one or more user devices 640 and 650 and the monitoring system.

In some implementations, the one or more user devices 640 and 650 may be configured to switch whether the one or more user devices 640 and 650 communicate with the control unit server 610 directly (e.g., through link 638) or through the monitoring application server 660 (e.g., through network 605) based on a location of the one or more user devices 640 and 650. For instance, when the one or more user devices 640 and 650 are located close to the control unit server 610 and in range to communicate directly with the control unit server 610, the one or more user devices 640 and 650 use direct communication. When the one or more user devices 640 and 650 are located far from the control unit server 610 and not in range to communicate directly with the control unit server 610, the one or more user devices 640 and 650 use communication through the monitoring application server 660.

Although the one or more user devices 640 and 650 are shown as being connected to the network 605, in some implementations, the one or more user devices 640 and 650 are not connected to the network 605. In these implementations, the one or more user devices 640 and 650 communicate directly with one or more of the monitoring system components and no network (e.g., Internet) connection or reliance on remote servers is needed.

In some implementations, the one or more user devices 640 and 650 are used in conjunction with only local sensors and/or local devices in a house. In these implementations, the system 600 only includes the one or more user devices 640 and 650, the sensors 620, the module 622, and the camera 630. The one or more user devices 640 and 650 receive data directly from the sensors 620, the module 622, and the camera 630 and sends data directly to the sensors 620, the module 622, and the camera 630. The one or more user devices 640, 650 provide the appropriate interfaces/processing to provide visual surveillance and reporting.

In other implementations, the system 600 further includes network 605 and the sensors 620, the module 622, the camera 630, and the thermostat 634 are configured to communicate sensor and image data to the one or more user devices 640 and 650 over network 605 (e.g., the Internet, cellular network, etc.). In yet another implementation, the sensors 620, the module 622, the camera 630, and the thermostat 634 (or a component, such as a bridge/router) are intelligent enough to change the communication pathway from a direct local pathway when the one or more user devices 640 and 650 are in close physical proximity to the sensors 620, the module 622, the camera 630, and the thermostat 634 to a pathway over network 605 when the one or more user devices 640 and 650 are farther from the sensors 620, the module 622, the camera 630, and the thermostat 634. In some examples, the system leverages GPS information from the one or more user devices 640 and 650 to determine whether the one or more user devices 640 and 650 are close enough to the sensors 620, the module 622, the camera 630, and the thermostat 634 to use the direct local pathway or whether the one or more user devices 640 and 650 are far enough from the sensors 620, the module 622, the camera 630, and the thermostat 634 that the pathway over network 605 is required. In other examples, the system leverages status communications (e.g., pinging) between the one or more user devices 640 and 650 and the sensors 620, the module 622, the camera 630, and the thermostat 634 to determine whether communication using the direct local pathway is possible. If communication using the direct local pathway is possible, the one or more user devices 640 and 650 communicate with the sensors 620, the module 622, the camera 630, and the thermostat 634 using the direct local pathway. If communication using the direct local pathway is not possible, the one or more user devices 640 and 650 communicate with the sensors 620, the module 622, the camera 630, and the thermostat 634 using the pathway over network 605.

In some implementations, the system 600 provides end users with access to images captured by the camera 630 to aid in decision making. The system 600 may transmit the images captured by the camera 630 over a wireless WAN network to the user devices 640 and 650. Because transmission over a wireless WAN network may be relatively expensive, the system 600 uses several techniques to reduce costs while providing access to significant levels of useful visual information.

In some implementations, a state of the monitoring system and other events sensed by the monitoring system may be used to enable/disable video/image recording devices (e.g., the camera 430). In these implementations, the camera 630 may be set to capture images on a periodic basis when the alarm system is armed in an "Away" state, but set not to capture images when the alarm system is armed in a "Stay" state or disarmed. In addition, the camera 630 may be triggered to begin capturing images when the alarm system detects an event, such as an alarm event, a door opening event for a door that leads to an area within a field of view of the camera 630, or motion in the area within the field of view of the camera 630. In other implementations, the camera 630 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A monitoring system that is configured to monitor a property, the monitoring system comprising:
   one or more sensors that are located throughout the property and that are configured to generate sensor data;
   a thermostat that is configured to control an HVAC system located at the property and that is configured to generate thermostat data;
   a monitor control unit that is configured to:
      receive, from the thermostat, thermostat data that indicates activity of the HVAC system and temperature history of the property;
      receive, from the one or more sensors, the sensor data;
      apply, to an HVAC model that is trained using past sensor data, past thermostat data, past errors of the HVAC system, and past actions that corrected the errors of the HVAC system, the thermostat data and the sensor data;
      based on applying the thermostat data and the sensor data to the HVAC model, determine an error of the HVAC system;
      based on the error of the HVAC system, determine an action for correcting the error of the HVAC system;
      provide, for output, data identifying the error of the HVAC system and the action for correcting the error of the HVAC system;
      receive data indicating completion of the action; and
      in response to receiving the data indicating completion of the action, obtain additional thermostat information by performing a test of the HVAC system,
   wherein the monitor control unit is configured to:
      based on determining the error of the HVAC system, determine an HVAC error classification that specifies a type of the error;
      determine the action for correcting the error of the HVAC system by determining the action for correcting the error of the HVAC system based on the HVAC error classification that specifies the type of the error,
   wherein the type of the error of the HVAC error classification comprises a heating vs. cooling category indicating an issue with the HVAC system not properly heating or cooling the property; an acute vs. inefficient category indicating an issue with one or more components of the HVAC system not working at a predetermined efficiency; a filter change category indicating an issue with an air quality in the property; or a long cycling category indicating an issue with a run time of the HVAC system.

2. The system of claim 1, wherein the monitor control unit is configured to:
   receive the sensor data by receiving, from a motion sensor that monitors motion at the property, motion data;

apply, to the HVAC model that is trained using the past sensor data, the past thermostat data, the past errors of the HVAC system, and the past actions that corrected the errors of the HVAC system, the thermostat data and the sensor data by applying, to the HVAC model, the thermostat data and the motion data; and determine the error of the HVAC system by determining the error of the HVAC system based on applying the thermostat data and the motion data to the HVAC model.

3. The system of claim 1, wherein the monitor control unit is configured to:

receive the sensor data by receiving, from a door or window sensor that monitors whether a door or a window is open or closed, door or window sensor data;

apply, to the HVAC model that is trained using the past sensor data, the past thermostat data, the past errors of the HVAC system, and the past actions that corrected the errors of the HVAC system, the thermostat data and the sensor data by applying, to the HVAC model, the thermostat data and the door or window sensor data; and determine the error of the HVAC system by determining the error of the HVAC system based on applying the thermostat data and the door or window sensor data to the HVAC model.

4. The system of claim 1, wherein the monitor control unit is further configured to:

receive timestamp data for the sensor data and the thermostat data; and apply, to the HVAC model that is trained using the past sensor data, the past thermostat data, the past errors of the HVAC system, and the past actions that corrected the errors of the HVAC system, the thermostat data and the sensor data by applying, to the HVAC model that is trained using the past sensor data collected during a time of day corresponding to the timestamp data, the past thermostat data collected during a time of day corresponding to the timestamp data, the past errors of the HVAC system, and the past actions that corrected the errors of the HVAC system, the thermostat data and the sensor data.

5. The system of claim 1, comprising:

a monitoring server that is configured to:

receive, from other monitoring systems that are configured to monitor other properties, the past sensor data of each monitoring system, the past thermostat data of each monitoring system, the past errors of each HVAC system of each property, and past actions that corrected the errors of each HVAC system of each property;

train, using machine learning, the HVAC model using the past sensor data of each monitoring system, the past thermostat data of each monitoring system, the past errors of each HVAC system of each property, and past actions that corrected the errors of each HVAC system of each property; and provide, for output to the monitor control unit, the HVAC model.

6. The system of claim 5, wherein the past errors of each HVAC system of each property and the error of the HVAC system are a same error.

7. The system of claim 5, wherein the HVAC system and the HVAC system of the other properties are a same model type.

8. The system of claim 5, wherein the HVAC system and the HVAC system of the other properties comprise different model types.

9. The system of claim 1, wherein the monitor control unit is configured to:

provide, for output, data identifying the error of the HVAC system and the action for correcting the error of the HVAC system, the error comprising at least one of a broken thermostat, unresponsive burner, unresponsive compressor, lack of refrigerant, broken blower, broken evaporator, or a low battery; and provide, for output, data instructing a user to shut off the HVAC system.

10. The system of claim 1, wherein the monitor control unit is further configured to perform the test by:

determining a first amount of time for the HVAC system to raise a temperature of the property by a temperature amount and a second amount of time to lower the temperature of the property by the temperature amount;

determining that the first amount of time satisfies a first time threshold;

determining that the second amount of time satisfies a second time threshold; and in response to determining that the first amount of time satisfies the first time threshold and determining that the second amount of time satisfies the second time threshold, determining the error of the HVAC system has been fixed.

11. The system of claim 1, wherein the monitor control unit is further configured to perform the test by:

determine a difference between a temperature of the property and a desired temperature of the property within a predetermined period;

determine that the difference between the temperature of the property and the desired temperature of the property satisfies a temperature threshold within the predetermined period; and in response to determining that the difference between the temperature of the property and the desired temperature of the property satisfies the temperature threshold within the predetermined period, determine the error of the HVAC system has been fixed.

12. A computer-implemented method, comprising:

receiving, by a monitoring system that is configured to monitor a property and from a thermostat that is configured to control an HVAC system located at the property, thermostat data that indicates activity of the HVAC system and temperature history of the property;

receiving, by the monitoring system and from one or more sensors that are located throughout the property, sensor data;

applying, by the monitoring system and to an HVAC model that is trained using past sensor data, past thermostat data, past errors of the HVAC system, and past actions that corrected the errors of the HVAC system, the thermostat data and the sensor data;

based on applying the thermostat data and the sensor data to the HVAC model, determining, by the monitoring system, an error of the HVAC system;

based on determining the error of the HVAC system, determining an HVAC error classification that specifies a type of the error;

based on the error of the HVAC system, determining, by the monitoring system, an action for correcting the error of the HVAC system;

providing, for output by the monitoring system, data identifying the error of the HVAC system and the action for correcting the error of the HVAC system;

receiving data indicating completion of the action; and in response to receiving the data indicating completion of the action, obtaining additional thermostat information by performing a test of the HVAC system, wherein determining the action for correcting the error of the HVAC system comprises determining the action for correcting the error of the HVAC system based on the HVAC error classification that specifies the type of the error, and wherein the type of the error of the HVAC error classification comprises a heating vs. cooling category indicating an issue with the HVAC system not properly heating or cooling the property; an acute vs. inefficient category indicating an issue with one or more components of the HVAC system not working at a predetermined efficiency; a filter change category indicating an issue with an air quality in the property; or a long cycling category indicating an issue with a run time of the HVAC system.

13. The method of claim 12, wherein:

receiving the sensor data comprises receiving, from a motion sensor that monitors motion at the property, motion data;

applying, to the HVAC model that is trained using the past sensor data, the past thermostat data, the past errors of the HVAC system, and the past actions that corrected the errors of the HVAC system, the thermostat data and the sensor data comprises applying, to the HVAC model, the thermostat data and the motion data; and determining the error of the HVAC system comprises determining the error of the HVAC system based on applying the thermostat data and the motion data to the HVAC model.

14. The method of claim 12, wherein:

receiving the sensor data comprises receiving, from a door or window sensor that monitors whether a door or a window is open or closed, door or window sensor data;

applying, to the HVAC model that is trained using the past sensor data, the past thermostat data, the past errors of the HVAC system, and the past actions that corrected the errors of the HVAC system, the thermostat data and the sensor data comprises applying, to the HVAC model, the thermostat data and the door or window sensor data; and determining the error of the HVAC system comprises determining the error of the HVAC system based on applying the thermostat data and the door or window sensor data to the HVAC model.

15. The method of claim 12, further comprising:

receiving timestamp data for the sensor data and the thermostat data;

wherein applying, to the HVAC model that is trained using the past sensor data, the past thermostat data, the past errors of the HVAC system, and the past actions that corrected the errors of the HVAC system, the thermostat data and the sensor data comprises applying, to the HVAC model that is trained using the past sensor data collected during a time of day corresponding to the timestamp data, the past thermostat data collected during a time of day corresponding to the timestamp data, the past errors of the HVAC system, and the past actions that corrected the errors of the HVAC system, the thermostat data and the sensor data.

16. A monitoring server, comprising:

one or more computers; and one or more storage devices storing instructions that, when executed by the one or more computers, cause the one or more computers to perform operations comprising:

receiving, from a thermostat that is configured to control an HVAC system located at the property, thermostat data that indicates activity of the HVAC system and temperature history of the property;

receiving, from one or more sensors that are located throughout the property, sensor data;

applying, to an HVAC model that is trained using past sensor data, past thermostat data, past errors of the HVAC system, and past actions that corrected the errors of the HVAC system, the thermostat data and the sensor data;

based on applying the thermostat data and the sensor data to the HVAC model, determining an error of the HVAC system;

based on determining the error of the HVAC system, determining an HVAC error classification that specifies a type of the error;

based on the error of the HVAC system, determining an action for correcting the error of the HVAC system;

providing, for output, data identifying the error of the HVAC system and the action for correcting the error of the HVAC system;

receiving data indicating completion of the action; and in response to receiving the data indicating completion of the action, obtaining additional thermostat information by performing a test of the HVAC system, wherein determining the action for correcting the error of the HVAC system comprises determining the action for correcting the error of the HVAC system based on the HVAC error classification that specifies the type of the error, and wherein the type of the error of the HVAC error classification comprises a heating vs. cooling category indicating an issue with the HVAC system not properly heating or cooling the property; an acute vs. inefficient category indicating an issue with one or more components of the HVAC system not working at a predetermined efficiency; a filter change category indicating an issue with an air quality in the property; or a long cycling category indicating an issue with a run time of the HVAC system.

17. The monitoring server of claim 16, wherein:

receiving the sensor data comprises receiving, from a motion sensor that monitors motion at the property, motion data;

applying, to the HVAC model that is trained using the past sensor data, the past thermostat data, the past errors of the HVAC system, and the past actions that corrected the errors of the HVAC system, the thermostat data and the sensor data comprises applying, to the HVAC model, the thermostat data and the motion data; and determining the error of the HVAC system comprises determining the error of the HVAC system based on applying the thermostat data and the motion data to the HVAC model.

18. The monitoring server of claim 16, wherein:

receiving the sensor data comprises receiving, from a door or window sensor that monitors whether a door or a window is open or closed, door or window sensor data;

applying, to the HVAC model that is trained using the past sensor data, the past thermostat data, the past errors of the HVAC system, and the past actions that corrected the errors of the HVAC system, the thermostat data and the sensor data comprises applying, to the HVAC model, the thermostat data and the door or window sensor data; and determining the error of the HVAC system comprises determining the error of the HVAC system based on applying the thermostat data and the door or window sensor data to the HVAC model.

19. The monitoring server of claim 16:
wherein the operations comprise receiving timestamp data for the sensor data and the thermostat data; and
wherein applying, to the HVAC model that is trained using the past sensor data, the past thermostat data, the past errors of the HVAC system, and the past actions that corrected the errors of the HVAC system, the thermostat data and the sensor data comprises applying, to the HVAC model that is trained using the past sensor data collected during a time of day corresponding to the timestamp data, the past thermostat data collected during a time of day corresponding to the timestamp data, the past errors of the HVAC system, and the past actions that corrected the errors of the HVAC system, the thermostat data and the sensor data.

20. The monitoring server of claim 16, wherein the operations comprise:
receiving, from other monitoring systems that are configured to monitor other properties, the past sensor data of each monitoring system, the past thermostat data of each monitoring system, the past errors of each HVAC system of each property, and the past actions that corrected the errors of each HVAC system of each property; and
training, using machine learning, the HVAC model using the past sensor data of each monitoring system, the past thermostat data of each monitoring system, the past errors of each HVAC system of each property, and the past actions that corrected the errors of each HVAC system of each property.

\* \* \* \* \*